(No Model.) 3 Sheets—Sheet 2.
G. W. KIRKPATRICK, A. MAY & G. W. STEVENS.
GRAIN DRILL.
No. 559,336. Patented Apr. 28, 1896.
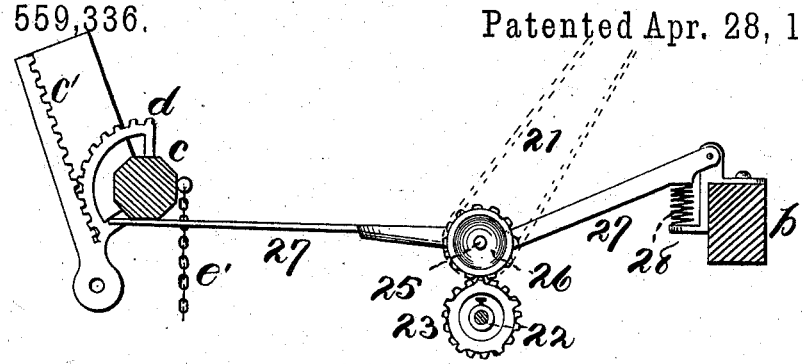
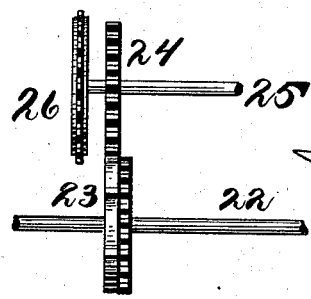
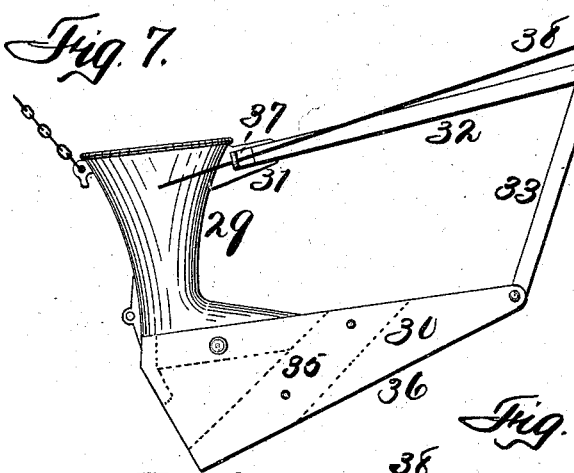
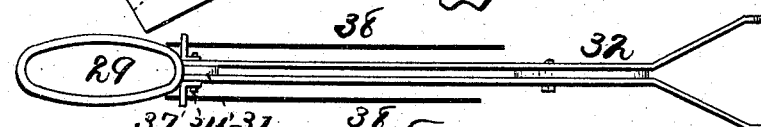
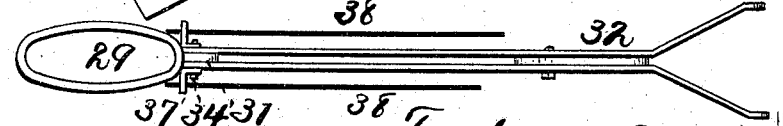
WITNESSES:
Charles W. Morvin.
Jesse E. Murray.
INVENTORS
George W. Kirkpatrick.
Adolph May.
George W. Stevens.
BY
Smith & Denison
ATTORNEYS.

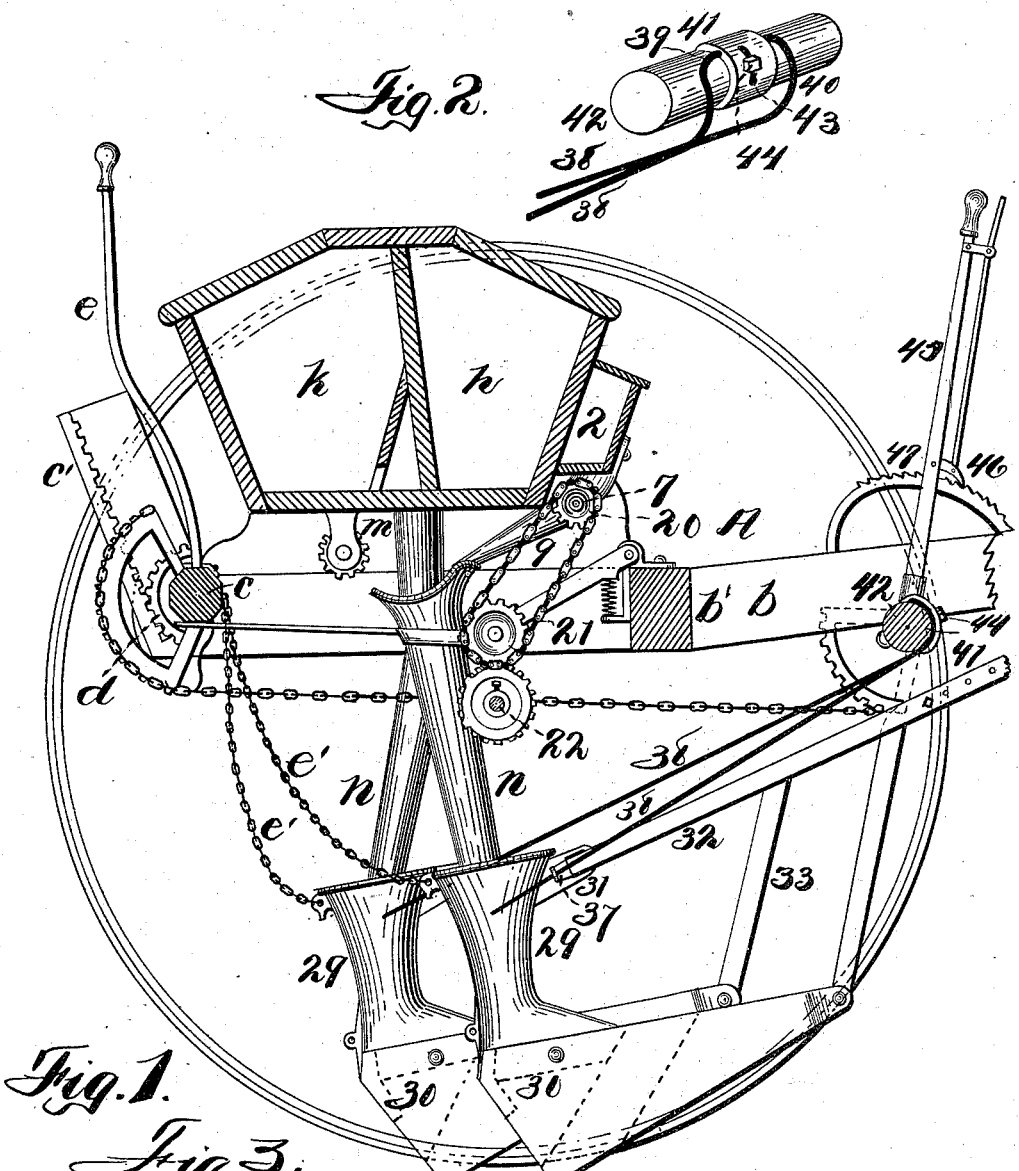

(No Model.) 3 Sheets—Sheet 3.

G. W. KIRKPATRICK, A. MAY & G. W. STEVENS.
GRAIN DRILL.

No. 559,336. Patented Apr. 28, 1896.

WITNESSES:
Charles N. Marvin
Jesse E. Murray

INVENTORS
George W. Kirkpatrick,
Adolph May,
George W. Stevens.
BY
Smith & Dembow
ATTORNEYS.

United States Patent Office.

GEORGE W. KIRKPATRICK, ADOLPH MAY, AND GEORGE W. STEVENS, OF MACEDON, NEW YORK, ASSIGNORS TO THE BICKFORD & HUFFMAN COMPANY, OF SAME PLACE.

GRAIN-DRILL.

SPECIFICATION forming part of Letters Patent No. 559,336, dated April 28, 1896.

Application filed September 28, 1895. Serial No. 564,049. (No model.)

*To all whom it may concern:*

Be it known that we, GEORGE W. KIRKPATRICK, ADOLPH MAY, and GEORGE W. STEVENS, of Macedon, in the county of Wayne, in the State of New York, have invented new and useful Improvements in Grain-Drills, of which the following, taken in connection with the accompanying drawings, is a full, clear, and exact description.

Our invention relates to grain-drills and attachments thereto.

Heretofore grain-drills have been adapted to be used for the sowing of grain and field-seeds generally with the ordinary grass-seeds, the latter being sown broadcast, and many of such drills are provided with fertilizer-sowing attachments of various kinds; but a necessity has arisen for adapting them to be used for planting such seed as turnip, rape, and other similar seeds and to deposit same in the soil to be covered with or without other grain and fertilizers and at regular-spaced distances apart by providing them with a suitable attachment for that purpose, whereby grain can be sown, grass-seeds broadcasted, and turnip or rape seeds planted by the same machine, and fertilizers can be fed to the grain and planted seed, as may be desired.

Difficulty has heretofore been had in making drill shoes or runners V-shaped in cross-section on account of the great liability of the sides to sag or bend inwardly in manufacture, whereby they became distorted in cross-sections, so that they did not properly open the furrow or did not properly permit the flow of the grain through them into the furrow, so that it would be evenly distributed and evenly covered with soil, and the shoes when thus sagged inwardly on sides did not properly clean or scour in certain conditions of soils, thus impairing the efficiency of the drill. All of these points are embodied and corrected in our invention, in which the shoes are made from sheet metal bent or folded on one line to a V shape in cross-section and reinforced by the insertion of wedge-shaped filling, which extends diagonally from the heel of the shoe upward and forward to the top edge of the shoe, whereby the shoes are kept in true wedge shape from the lower edge to the top edge and from the forward part or point to the rear of the V-opening in the shoe and the sides prevented from sagging or bending inwardly, the shoe being provided with a cast section of hoe, boot, or conductor, which is riveted in heel of the shoe and through which the grain, seeds, and fertilizers pass from grain, seed, and fertilizer boxes through suitable conductors attached to the several feeding devices. The wedge-shape filling in shoe being set at an angle of about thirty degrees deflects the grain and seeds into almost the bottom of the furrow or trench made by the shoe in the soil and at a uniform depth, the cast boot or shoe being provided with an apron extending downward between the rear ends of shoe-wings, so as to prevent falling seeds from being thrown out upon the surface of the soil and to prevent the soil from falling in between the rear wings of the shoe, and thus possibly clog the seed-opening or cover the seed at uneven depths. This shoe is suitably connected to the drag-bar, as is usual in drills, said drag-bar being suitably hinged to the main frame, and upon this frame the ordinary grain and fertilizer hoppers are mounted, and a seed-box is secured onto the front of the grain-box, having its bottom above the plane of the lower part of said grain-box. The bottom of the seed-box is provided with openings at intervals, and beneath them a series of distributers are mounted. The grain-box, seed-box, and a series of distributers are mounted upon this bottom and are interiorly connected thereto, each comprising a casing open full size at one end, a feed-cylinder inserted thereinto and grooved or corrugated exteriorly and mounted within such casing in such a manner as to prevent the crushing of any seed, all of said grooved feed-cylinders being secured upon a single shaft inserted through said casing, means being provided to rotate said shaft and the cylinders attached thereon simultaneously, an opening being provided in each casing for the discharge of the seed into chutes which conduct the seed into funnels which are used to conduct the grain and fertilizers into the shoes or hoes and the furrows made thereby, means being also provided to shift said shaft and cylinders longitudinally without backlash or slack-end movement to regulate and vary the discharge of seed, according to a scale and a pointer actuated by said shifting mechanism, in which means are provided for stopping the rotation of the feed-shaft of the seed-planting mechanism which is rotated by means of a suitable gear, in which means are provided for spring-pressing the shoes or hoes into the soil and for varying the tension of the springs according to the depth of furrow desired, or for wholly removing such tension, as when the shoes or hoes are to be raised from the ground or to be used without pressure. It is constructed as follows, reference being had to the accompanying drawings, in which—

Figure 1 is a sectional elevation of a grain-drill with the feed-box attached for planting, the seed-feeding mechanism and seed-conduits leading to the funnels, the spring-pressed shoes and spring-tension-regulating mechanism and the shoe raising and lowering mechanism. Fig. 2 is a perspective of the tension-shaft and a shoe-spring connected thereto. Figs. 3 and 4 are respectively a top plan and a side elevation of a shoe or hoe spring. Figs. 5 and 6 are respectively a front elevation and an edge view of the clip by which the hoe-springs are connected to the shaft. Fig. 7 is a side elevation of a shoe, boot and its drag-bar, a shoe or hoe spring, its mounting upon the shaft, and the connection of the drag-bar to the frame. Fig. 8 is a transverse section of a shoe and its wedge-shape filling. Fig. 9 is a top plan of a hoe, drag-bar, and hoe-spring. Fig. 10 is a bottom plan of a part of the seed-box, the feed-shaft, a seed-distributer, the shaft-shifting mechanism, scale, and pointer. Fig. 11 is a front elevation of the same. Fig. 12 is a sectional elevation of a seed-distributer. Fig. 13 is a transverse section of the same, the feed-shaft being in elevation. Fig. 14 is a top plan of a casing for a seed-distributer. Fig. 15 is a sectional elevation of part of the frame and the mechanism for driving and stopping the seed-feed shaft. Fig. 16 is a side elevation of the gearing for driving said shaft.

A is the frame of a drill, comprising a front rail $a$, a suitable longitudinal rail $b$ parallel thereto, and cross-rails $b'$, a rear roller or shaft $c$, adapted to be rotated and provided with an ordinary rack $c'$, gear segments or pinions $d$, and hand-lever $e$ and chains $e'$, connected to said shaft and to the shoes or hoes, whereby they are raised or lowered by the partial rotation and elevation of the shaft.

$h$ $k$ are respectively the grain and fertilizer boxes or hoppers, all of any ordinary construction, said hoppers being provided with any ordinary or desired mechanism for feeding the grain or fertilizer into the conductors $m$, which lead into the funnels $n$, which are of ordinary construction.

Upon the front of the grain-hopper or grain and fertilizer hopper combined a seed box or hopper 2 is secured of substantially the shape shown in cross-section and extending the whole length of the grain-box, and upon its lower side a series of seed-distributers are secured, each comprising a casing having tubular body 3, open at one end, and a suitable base 4, provided with an opening $r$ through it into the body and registering with a suitable opening through the bottom of the seed-box, and a feed-cylinder 5, fitting loosely into said distributers, and provided with grooves 6 upon its periphery and suitably secured upon a shaft 7, which passes through the casing and is adapted to be reciprocated therein, so that by shifting said shaft all of said feed-cylinders are shifted in their casings simultaneously without backlash or loose-end motion to positively vary the feed by varying the extent of said grooves, which is exposed in the opening 8 in the casing, and through which the seed is discharged into the chutes 9 and conducted into the funnels.

The feed of seed is regulated by adjusting the feed-cylinder in the casings by means of a loop 10, mounted upon the shaft loosely, suitable means being provided to permit the shaft to revolve without rotating said loop, a nut 11 upon said loop and a threaded rod 12 through said nut, and a hand-wheel 13 upon said rod, upon which a coil-spring is mounted, a stop-pin 14, engaging with the block 15, in which said rod is journaled, the said spring 16 being between the block 15 and the hand-wheel; also, that by operating said rod said shaft and feed-cylinders are moved so as to vary the extent of the exposure of said grooves in said cylinders and the amount of seed discharged from each groove. These cylinders enter part way only into their respective casings, leaving a space 17 in each one between the inner end and the head of said casing, into which space all of the seed is fed directly, and from which it flows laterally into the grooves in each cylinder. The feed-discharge opening of said cylinders is so located as to prevent the losing or wasting of seed when the drill is at rest or when in travel and not adjusted for the distribution of seed.

To adjust the feed to any desired point a pointer 18 is pivoted adjacent to a scale 19 upon the seed-box, and one end is pivotally connected to said loop, so that the pointer is swung by and according to the said movement of the feed shaft and cylinder.

A suitable pulley 20 is secured upon the feed-shaft, and a suitable chain or belt 21 is carried around a pulley upon and rotated by the axle 22, or where the feed is to be intermittent a mutilated gear 23 is secured upon said axle, here shown with a spur-gear beside it, which is used to drive the feed mechanism with a steady or uniform revolution. This mutilated gear intermittently engages with the spur-gear 24 upon a suitably-journaled shaft 25, and intermittently drives the sprocket or other pulley 26 upon said shaft, and this actuates the belt 21 to intermittently rotate the seed-feeding cylinders.

To stop the seed-feed mechanism the following mechanism is provided: A lever 27 is hinged to a frame-bar and extends across the frame and engages with the lifting-roller $c$, and 28 is a spring engaging with said lever. The sprocket shaft or arbor 25 is journaled or secured in said lever, and when said roller is in the position shown in Fig. 15 it will hold the parts in operative position, and when said roller is rotated and raised said spring will raise said spur-gear out of engagement with said feed-gear and stop the feed.

The funnels conduct the grain or fertilizer, or both, or the seed or fertilizer, or both, into the tubular shank 29 of the hoe, and 30 is the furrow-making runner secured thereto, said shank being provided with a lug 31 to which the parallel drag-bars 32 are pivoted at 34, their front ends being bifurcated and hinged to the frame-bar. This hoe-runner consists of a piece of suitable sheet metal folded so as to become of V shape in cross-section. Its rear upper edges are secured to the hoe-shank and its front end is pivotally connected to the angular draw-bar 33, which is adjustably connected to the drag-bars, as by a bolt 34'. Experience has shown that such a sheet-metal shoe in the ordinary course of manufacture have one or both sides of the same made concave, preventing them from properly cleaning or scouring in certain soils and preventing them from making a furrow of the proper width and the depositing of the seeds at a uniform depth. For reinforcing the shoe-body and the securing of a true wedge shape to the shoe in all directions we insert a filler 35 into it, extending from the heel thereof diagonally across it and upward through it to the top, substantially as shown by the dotted lines in Fig. 7, filling the space between the sides at the point or points where trouble is most likely to arise in manufacture and holding the sides out to true shape, whereby the shoe will open a better-shaped furrow in the soil and clean or scour the shoe properly. To hold the shoe or hoe in the ground so as to make a furrow of uniform depth, and at the same time leave it free to rise vertically when it encounters and passes an obstruction, and to drop into dead furrows and depressions in surface of soil, which we have found is done better by having a straight edge 36 than with one in which the front end is curved upward, and at the same time reduce the frictional contact of the hoe with the soil, we have made the edge straight and have mounted it so that said edge stands at an angle to the ground and use the following spring-pressure mechanism:

Ears 37 are mounted upon the bolt which connects the shoe or hoe shank to the drag-bars, through which ears the arms 38 of the spring pass. The spring consists of a piece of spring metal, bent centrally, as at 39, then bent forward and curved downward, as at 40, and thence the arms extend back to and through the ears fitting loosely therein. The bend 39 fits into and through a groove $w$, across the clip 41, which is curved interiorly to fit into a shaft 42 and corrugated interiorly to bite into said shaft, and provided with a slot 43, through which the bolt 44 passes, by which the clip is adjustably secured to said shaft, so that each and every spring may be set upon the shaft at a uniform point of tension or to secure a proper adjustment of the springs upon the shaft.

To regulate the tension of the springs or pressure of same upon the shoes or hoes, the shaft is journaled upon or into the frame, a hand-lever 45 is secured thereto and provided with a pawl 46, which engages with the segmental rack 47, which is mounted upon the frame or pole, so that by rotating the shaft in one direction by throwing said lever back the tension of springs upon shoes or hoes is increased, and by throwing it forward it is reduced or entirely removed, which is proper to do when it is desired to raise the hoes or shoes from the ground or when pressure is not required.

It will be readily seen that the spring-pressure regulates the depth of the furrow and that in our construction it is applied at a point substantially vertical to the heel of the hoe or shoe, where it will do its work most effectively, this form of spring at the same time allowing the greatest possible range or swing of the shoe or hoe, yet with pressure applied at all points and without cramping or buckling the spring at 39 and 40, being so mounted and attached to rocking shaft that the spring comes in contact with the shaft only at the point of attachment, bending outward and away from shaft at that point, so as to secure the most perfect torsion pressure and range of the spring.

What we claim, and desire to secure by Letters Patent, is—

1. The combination with a grain-hopper and the funnels connected thereto, of an auxiliary seed-box mounted upon said hopper, conduits leading therefrom to said funnels, rotating seed-distributers mounted upon and interiorly connected to said seed-box, a feed-gear, a spur-gear driven thereby, a sprocket driven by said spur-gear and means to rotate said seed-distributers actuated by the rotation of said sprocket independent of the grain-feeding mechanism.

2. The combination with the seed-box of a series of tubular casings secured upon and interiorly connected thereto, a rotating shaft passing centrally through said casings, feed-cylinders secured upon said shaft having horizontal grooves in their peripheries and projecting into said casings to create seed-chambers between the inner ends of said cylinders and the ends of the casings whereby the seed is fed horizontally into said grooves, and means to shift said shaft longitudinally to vary the size of said seed-chambers and the feed of said cylinders.

3. In a drill, a shoe comprising a tubular shank combined with a furrow-making runner consisting of a piece of sheet metal folded to a V shape in cross-section to create a straight edge, and secured to said shank, and a reinforcing-block fitting into the angle of the runner at the heel thereof thence extending forward and upward to the top of said runner in front of said shank, whereby it reinforces the sides of said runners from top to bottom and holds them true to shape, and its inclined upper face forms part of the feed-chute to deposit the seed in the bottom of the furrow.

4. The combination with the frame, a shoe and a drag-bar connecting it to said frame, of a shaft journaled in said frame, a spring having double or parallel arms, connected to said shaft and having its rear ends connected to opposite sides of said shoe, and means to rotate said shaft to vary the spring-pressure upon said shoe.

5. The combination with the frame, a shoe and a drag-bar connecting it to said frame, of a shaft journaled in said frame, a spring having parallel arms connected to opposite sides of said shoe, a clip adjustably mounted upon said shaft and means to rotate said shaft to vary the spring-pressure upon the shoe.

6. In a drill, a spring consisting of a rod bent centrally, then downwardly and curving forward and thence extending back in parallel arms to and engaging with a shoe, in combination with said shoe, and means to mount the bent and curved end of said spring.

7. The combination with the frame, and shoes connected thereto by drag-bars, of springs carried by said frame and engaging with said shoes at points substantially vertical to their heels and at opposite sides of the tops of said shoes.

8. The combination with the seed-box of a series of tubular casings secured upon and interiorly connected thereto closed at one end and having a discharge-opening at the other, a rotary shaft passing centrally through said casings, feed-cylinders secured upon said shaft and having horizontal grooves in their peripheries and projecting into said casings in such manner as to create seed-chambers, between the inner ends of said cylinders and the closed ends of the casings, which are directly in alinement with the connections between the casings and the seed-box, whence the seed is fed laterally into said grooves and through them to the discharge-openings in the open ends of said casings by the rotation of said shaft and cylinders.

In witness whereof we have hereunto set our hands on this 15th day of June, 1895.

GEORGE W. KIRKPATRICK.
ADOLPH MAY.
GEORGE W. STEVENS.

In presence of—
C. W. SMITH,
CHAS. C. BURHANS.